United States Patent [19]

Huignard et al.

[11] Patent Number: 4,836,629
[45] Date of Patent: Jun. 6, 1989

[54] DEVICE TO CONTROL A LIGHT BEAM IN A WIDE ANGLE FIELD AND APPLICATION TO A SENSING DEVICE

[75] Inventors: Jean Pierre Huignard, Paris; Jean Louis Meyzonnette, Jouy En Josas, both of France

[73] Assignee: Thomson-CSF, Paris, France

[21] Appl. No.: 195,134

[22] Filed: May 17, 1988

[30] Foreign Application Priority Data

May 19, 1987 [FR] France ................................ 87 06991

[51] Int. Cl.⁴ .......................... G02B 5/32; G02F 2/00; G02F 2/02; H04B 9/00
[52] U.S. Cl. ............................... 350/3.73; 350/331 R; 350/358; 455/131
[58] Field of Search .................. 350/3.73, 358, 331 R, 350/3.64; 455/131

[56] References Cited

U.S. PATENT DOCUMENTS

| | | | |
|---|---|---|---|
| 3,703,328 | 11/1972 | Glass | 350/3.5 |
| 3,976,873 | 8/1976 | Bottka | 250/199 |
| 4,309,602 | 1/1982 | Gonsalves | 250/201 |
| 4,447,149 | 5/1984 | Marcus | 356/5 |

FOREIGN PATENT DOCUMENTS

| | | |
|---|---|---|
| 2041059 | 1/1971 | France . |
| 2243573 | 9/1973 | France . |
| 2303433 | 7/1976 | France . |

OTHER PUBLICATIONS

8032, *Electronics* vol. 42, No. 11, May 26, 1969, pp. 54–56; "Sounding a light note".
8106, *IEEE Journal of Quantum Electronics* vol. QE-22, No. 8, Aug. 1986, pp. 1493–1502; T. Tschudi et al.: "Image Amplification by Two–and Four–Wave Mixing in BaTIO₃ Photorefractive Crystals" *p. 1493, col. 2, line 31—p. 1494, col. 1, line 5*.

*Primary Examiner*—Bruce Y. Arnold
*Attorney, Agent, or Firm*—Oblon, Fisher, Spivak, McClelland & Maier

[57] ABSTRACT

The device to control the direction of a light beam comprises mainly the following elements substantially aligned in the direction of a laser beam emitted by a source: a low-deflection, controlled deflection device; a holographic multiplexer comprising several recorded zones and giving several possible deflections depending on the direction of the beam that it receives; a system of shutters enabling the choice of the direction of the laser beam to be transmitted.

13 Claims, 5 Drawing Sheets

DEVICE TO CONTROL A LIGHT BEAM IN A WIDE ANGLE FIELD AND APPLICATION TO A SENSING DEVICE

BACKGROUND OF THE INVENTION

1. Field of the Invention

The invention relates to a device to control the angular direction of a laser beam and, especially, to a device for the orientation of a light beam in a wide angle field. Furthermore, the invention enables an amplification, as desired, of the wave by means of a non-linear medium. For each direction of deflection, it is possible to correct surface wave phase distortions induced by atmospheric turbulence or by geometrical aberrations in the optic components.

2. Brief Description of the Prior Art

Controlling the angular direction of laser beams with very large diameters (of 1 to 10 cm. for example) is a important function of power laser devices working in continuous or pulsed mode and used for the designation or tracking of moving objects.

Known systems do not give wide angular deflections in a beam.

The invention relates to a device for the angular deflection of a beam in a wide angle field reaching $+60°$.

SUMMARY OF THE INVENTION

The invention thus relates to a device to control the direction of a first light beam, emitted by a laser source including the following different, successive elements aligned in the direction of this first light beam:

A low-deflection controlled deflection device, that receives the first light beam and transmits a second beam along a second direction which is chosen from among several directions and makes an angle with the direction of the first beam;

a holographic multiplexer comprising several recorded zones each giving, for each beam received by each zone along said second direction, a third beam, the direction of which depends on said second direction;

shutters with open/close control, each placed in a possible direction of the third beam, enabling the choice of transmission of one or more determined third beams.

The invention also relates to a detection device which applies the above control device, wherein an electro-optic detection device is associated with the pumped beam by a semi-reflecting strip so as to receive a detecting light beam coming from outside the device.

BRIEF DESCRIPTION OF THE DRAWINGS

The various objects and features of the invention will appear more clearly from the following description, made with reference to the appended drawings, of which.

DETAILED DESCRIPTION OF THE INVENTION

Figure 1:
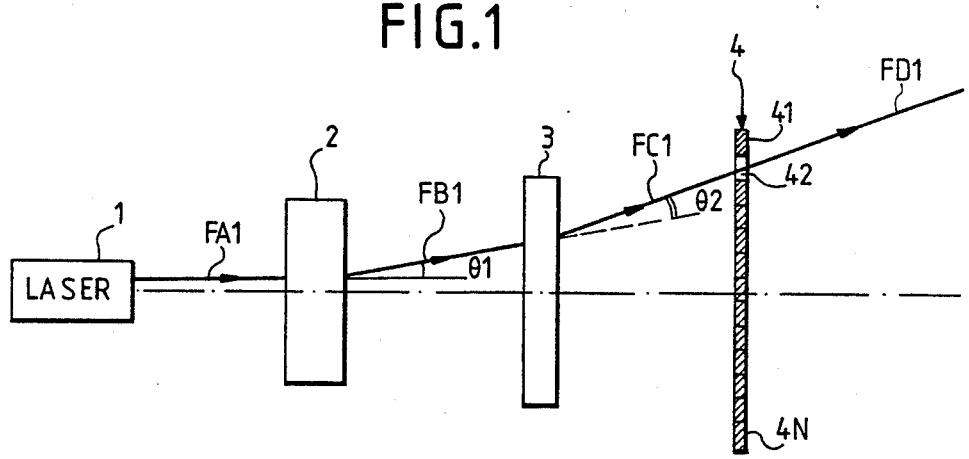
FIG. 1 shows an embodiment of a deflection device according to the invention.

Referring to FIG. 1, we shall first describe an embodiment of a device, according to the invention, for controlling the direction of a beam. This control device has a laser source 1 emitting a light beam FA1 towards a deflection device 2. This deflection device 2 slightly deflects the beam FA1 and gives a beam FB1 that makes an angle $\theta$ with the beam FA1. In FIG. 1, this deflection has been accentuated to make it visible. The beam FB1 is transmitted to a holographic multiplexer giving several beams for each deflection angle $\theta 1$. Of these several beams, only one beam FC1 has been shown. These beams make different angles ($\theta 2$) with the direction of the beam FB1. A system 4 of shutters, comprising a series of shutters 41 to 4N, receives the light beams such as FC1. The opening of one of the shutters selects the passage of one of the beams. For example, with the shutter 42 open, the beam FC1 is transmitted in the form of the beam FD1.

For example, the deflection device 2 may give a deflection of up to $+2$ degrees with a resolution of $n \times n = 10^2 \times 10^2$ to $10^3 \times 10^3$. This deflection is obtained by:

an acousto-optical deflection of the beam in X-Y;

a grating of electrooptic phase-shifting devices providing for controlled deflection of the beam (for example, antenna with electrooptic scanning).

The holographic multiplexer 3 is constituted by a holographic optical element generating a matrix of $N \times N$ points on any one of the directions coming from the deflection device 2. Since the deflection device can be used to obtain $n \times n$ different directions of beams, and since each beam direction can have $N \times N$ directions such as FC1, the number of possible directions at the output of the holographic multiplexer is $(n \times n)(N \times N)$. If $N \times N$ can go up to $10^2 \times 10^2$, the total number of directions at the output may be $10^8$ to $10^{10}$.

The grating of shutters 4 can be made in the form of a liquid crystal display or semi-conducting materials (such as Si, GaAs, MQW etc.) that are made light-absorbent by application of electricity (hereinafter electro-absorbent materials).

Depending on the materials used, the changing-over time varies by a few $\mu s$ (for ferro-electric liquid crystals) to a few $\mu s$ (for semiconductor materials). The number of shutters is $N \times N = 10^2 \times 10^2$, for example.

Each shutter can be controlled individually, by means of line and column electrodes. The use of an electrooptic shutter enables the transmission, in one direction, of the beam coming from the deflector, the $N^2 - 1$ other directions being stopped.

Figure 4:
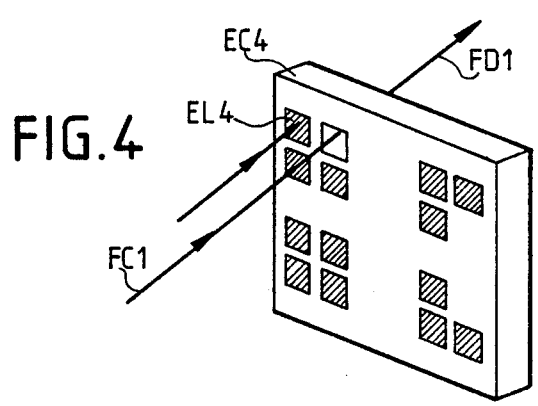
FIG. 4 shows an embodiment of the shutter device of the deflection device according to the invention.

FIG. 4 shows an example of a grating of shutters of this type having an electrooptic device 4 controlled by line electrodes EL4 and column electrodes EC4.

Figure 2:
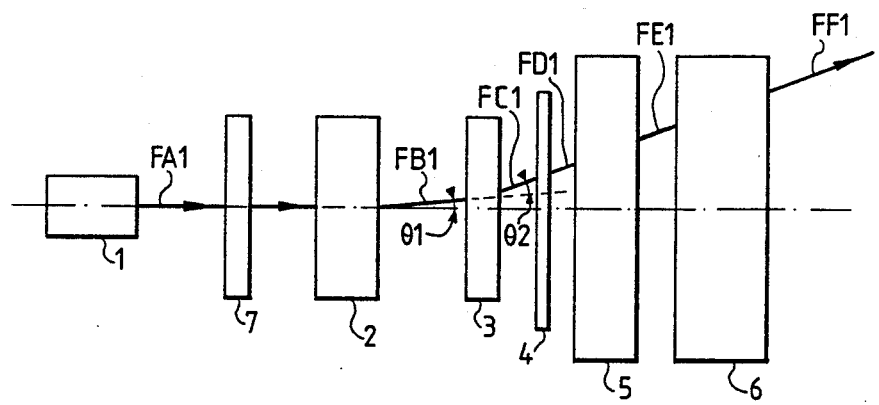
FIG. 2 shows a more complete embodiment of the device of FIG. 1.

FIG. 2 shows a more detailed view of an embodiment of the invention.

As compared with FIG. 1, the device of FIG. 2 further comprises a phase corrector 7 placed between the source 1 and the deflection device 2.

Figure 5:
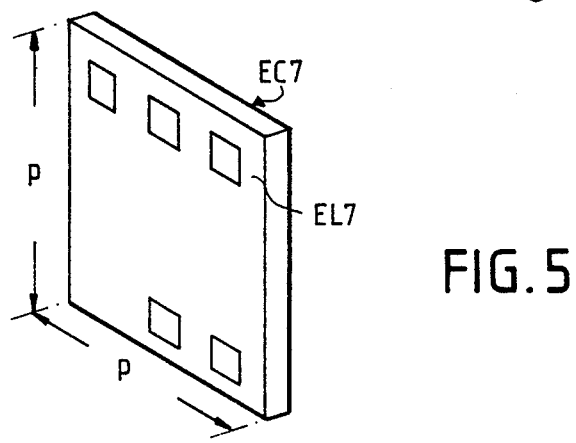
FIG. 5 shows an embodiment of the phase correction device of FIG. 2.

This phase corrector consists, for example, as shown in FIG. 5, of a two-dimensional grating of individually controlled electrooptic phase-shifting devices under the effect of voltage applied to each element of the matrix. Each element induces a variable phase shift, ranging between 0 and $2\pi$, on the wave surface, and the spatial distribution of the phase relationship is $-\phi(x,y)$. $+\phi(x,y)$ is the phase shift resulting from atmospheric turbulence and geometrical aberrations in the angle field of the output optic of the system. This phase relationship is known (geometrical aberrations) or measured (as turbulence etc.) in an ancillary interferometrical device. This spatial phase modulator, working in transmission or reflection, may consist of:

a grating of electro-optic phase modulators: liquid crystals, $LiNbO_3$, PLZT etc., which can be controlled by the effect of the line and column electrodes;

a grating of piezoelectric mirrors.

The transmitted (or reflected) wave is therefore affected by the phase relationship $-\phi(x,y)$, thus giving, at the output of the telescope, the generation of a wave limited by diffraction which is free of geometrical aberrations.

Additionally, the device of FIG. 2 has an amplification means or a wave amplifier 5 and an output optic device such as a telescope at the outlet of the device.

Figure 6:
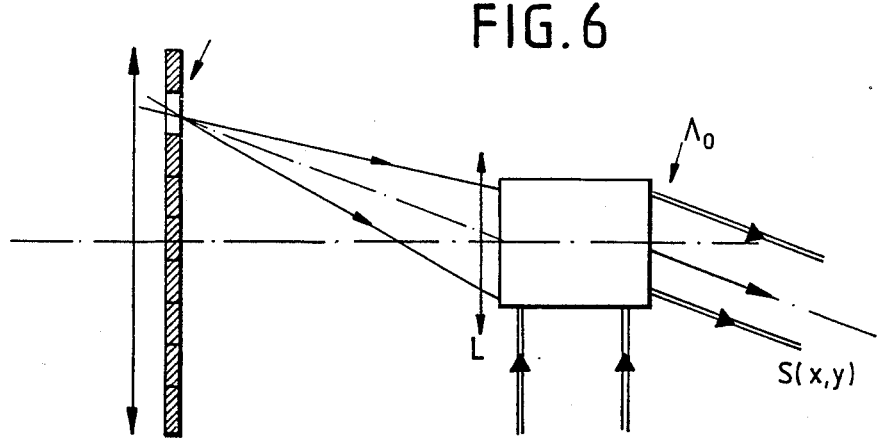
FIG. 6 shows an embodiment of the amplifier device of FIG. 2.

The wave amplifier 5 is used to amplify each wave for which the angular direction has been chosen by means of the grating of shutters 4. This amplification is done by mixing two waves in a non-linear medium. An example of an embodiment of an amplifier of this type is shown in FIG. 6.

The amplifier 5 receives the wave FD1 to be amplified and an pumped wave FB.

The gain received by energy transfer from the pump wave is equal to:

$$\frac{I_T}{I_S} = \exp[\Gamma - \alpha]l$$

with
l: interaction length of medium
$\Gamma$: gain coefficient$
$\alpha$: absorption coefficient For a sufficiently high value of the product $\Gamma l$, any incident energy of the pumped beam can be transferred on to the direction of the signal beam. High gains are effectively obtained ($\Gamma l = 10$ to 20) from the following effects:

photo-refractive effects in the electro-optic crystals ($BaTlO_3$; $Bi_{12} SiO_{20}$ - $BNO_3$ - $LiNbO_3$ ...)
stimulated Brillouin effects.

These non-linear effects enable the efficient amplification of a signal wave in an angle field of 60°. With the configuration shown in FIG. 5, the mean pitch of the strata of the dynamic phase-shift grating is equal to:

$$\Lambda_o \simeq \frac{\lambda}{2n_o} \times \frac{2}{\sqrt{2}}$$

if we have:

$n_o = 2,5; \lambda = 0,5 \mu m$

We obtain:

$\Lambda_o = 0,15 \mu m$

These gratings, of very high spatial frequency, are recorded in zero electric field conditions, by carrier diffusion effect in light-refracting crystals (such as $BaTiO_3$, $LiNbO_3$ etc) which show a high gain in this frequency range.

The beam amplified in a wide angle field (typically $\pm 60°$) is used to illuminate the object aimed at after passing through a telescope type of optic system (diameter of beam at output of telescope $\phi > 1$ m).

Figure 7:
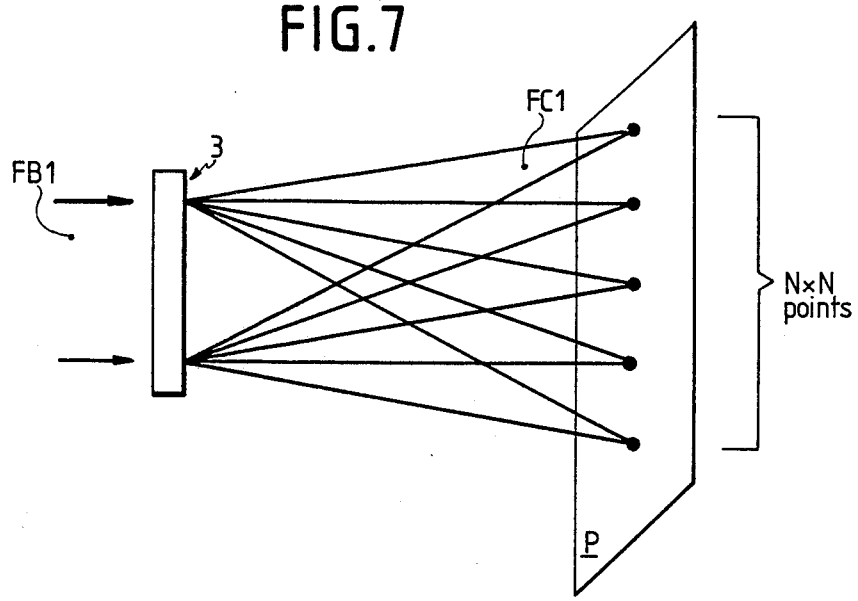
FIG. 7 shows an embodiment of the holographic multiplexer of FIG. 2.

As shown in FIG. 7, the holographic multiplexer 3 is recorded to ensure the multiplication of any one angular direction of a beam FB1, coming from the deflection device 2, into a matrix of $N \times N$ points located in a plane P. For simplicity's sake, FIG. 7 shows only one line of points of the matrix of $N \times N$ points.

Figure 3:
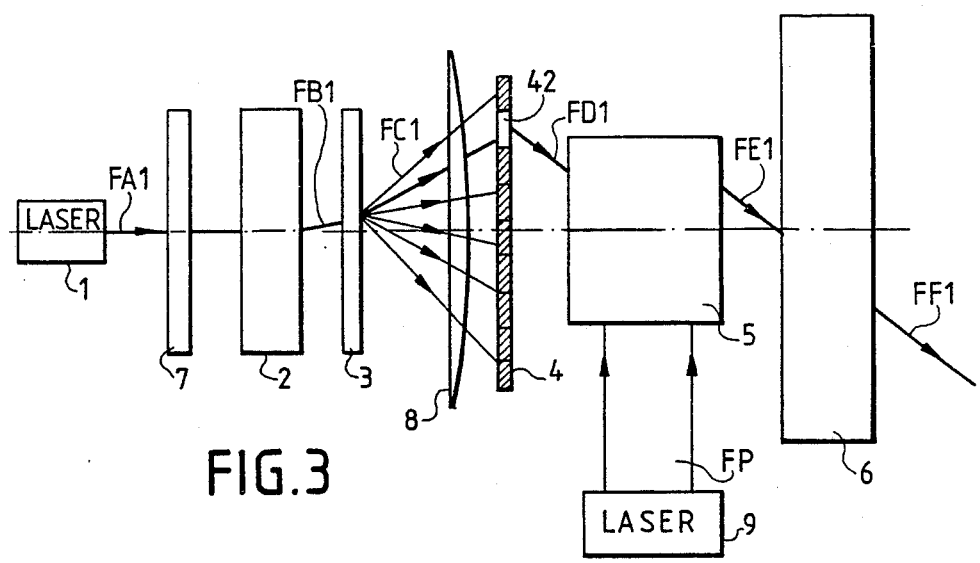
FIG. 3 shows an alternative embodiment of the deflection device of FIG. 2.
Figure 8:
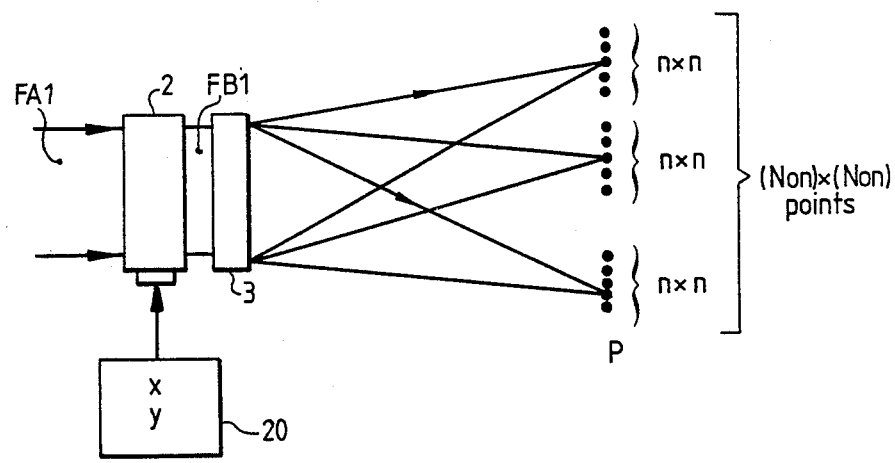
FIGS. 8 and 9 are examples of the functioning of the deflection device according to the invention.

FIG. 3 gives a fuller illustration of the device of the invention. This figure repeats the same elements as those of FIG. 2 with an additional focusing lens 8. The operation of the device of the invention shall be described in relation to this figure and the FIGS. 8 and 9.

The laser source 1 emits a light beam FA1. The laser source 1 emits a light beam FA1. The spatial modulator 7 enables a local correction of the phase of the wave surface, as a function of the distortions in the optical systems crossed through by the light beam until its leaves the telescope 6.

This deflection device 2 enables an angular deflection of the beam, and does so as a function of a radio-frequency signal applied by an electrical generator 20 to the device 2.

The holographic multiplexer 3 receives the beam FB1 and forms a number of points in a plane P, this number being $N \times N$. Since the deflection device 2 can give $n \times n$ different angular deflections, the number of points that can be formed in the plane P is, therefore, $N^2.n^2$.

Each point among the $N \times N$ points formed through the deflection given by the device 2 defines an angular direction. For a defined deflection of the device 2, we thus have $N \times N$ angular directions.

Figure 9:
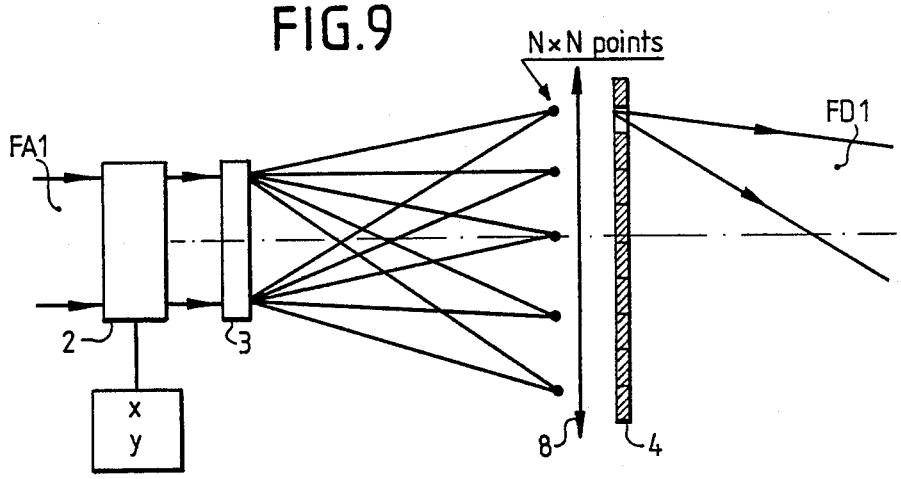

As shown in FIG. 9, the grating of shutters 4 selects the direction determined by a single point. The beam is then amplified by the amplifier 5 receiving a pumped wave from a laser source 9. It is then transmitted to the optic output system (the telescope) 6.

The device, which has just been described, for controlling the direction of a beam can be made, for example, with the following characteristics:

Deflection of beam in $\pm 60°$.
Diameter of beam $\phi = 5$ cm.
Wavelength $\lambda = 1.06 \mu m$.
Number of angular positions resolved $= 10^5$
Phase corrector: $p \times p = 10^2 \times 10^2$
Number of positions resolved by the 2D deflector ($TeO_2$ acousto-optic Bragg cell).

$n \times n = 10^3 \times 10^3$

Holographic multiplexer $N \times N = 10^2 \times 10^2$

Matrix of shutters $N \times N = 10^2 \times 10^2$

Losses due to angular scattering of beam by multiplexer = 40 dB.

Gain of amplifier medium to compensate for losses on signal wave G > 40 dB obtained under the following conditions:

$\Gamma = 10$ cm$^{-1}$ (BaTiO$_3$)
$l = 1$ cm$^{-1}$
$\alpha = 0.1$ cm$^{-1}$
Non-linearity establishing time:
$\tau \simeq 1$ ms for Ip = 100 W.cm$^{-2}$.

Figure 10:
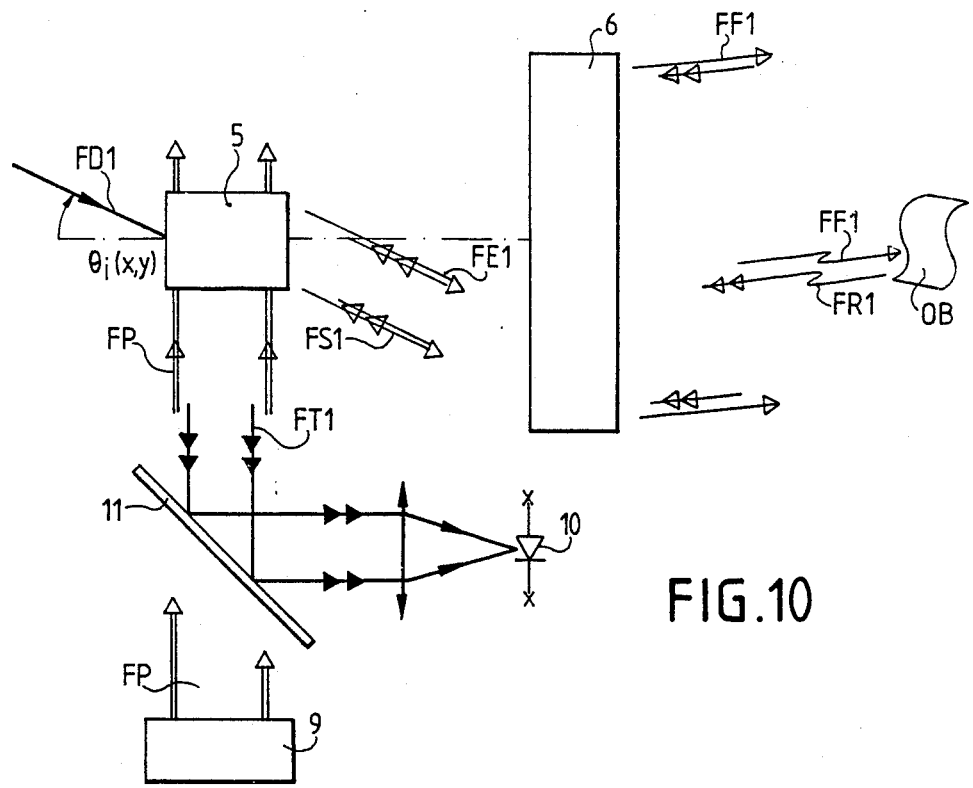
FIGS. 10 and 11 show embodiments of a wide angle field optic detection device.

Referring to FIG. 10, we shall now describe an application of the device to a detection system.

This detection system comprises all the elements of the angular control device of a light beam according to the invention. FIG. 10 shows only the amplifier 5 and the laser source 9, emitting the pumped beam, as well as the optic output system 6. The detection system further comprises an optic detection device 10 such as a photodiode coupled by means of a semi-reflecting strip 11 to the pumped beam FP.

As described earlier, the device according to the invention emits a beam FF1 along a defined direction. This beam is reflected by an object OB in the form of a beam FR1. The optical device 6 retransmits a beam FS1, having the same direction as the beam FE1, to the amplifier medium 5. This beam is diffracted by the dynamic phase-shift grating of the medium 5 in the direction of the pumped beam. A beam FT1 is retransmitted by the semi-reflecting strip 11 towards the optic detection device 10.

The device of the invention, with which is associated the detection device 10 associated with the pumped beam FP, thus enables the detection of the object OB illuminated by the beam FF1.

This detection can be done with a single detection device. Furthermore, with the possibility of angular control of the emitted beam, it is possible to scan and detect an object in the scanning field of the device.

Figure 11:
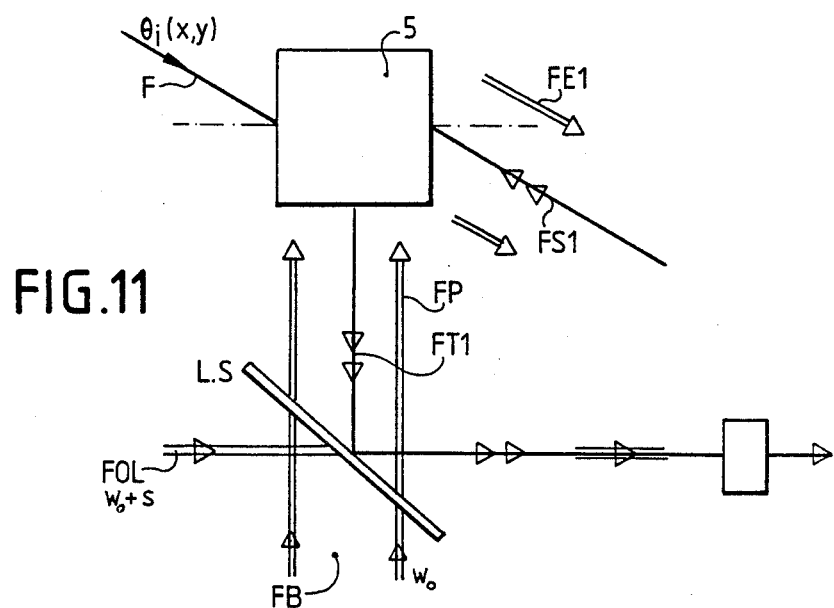

Furthermore, as shown in FIG. 11, the detection may be heterodyne detection. For this, there is provision for a light beam FOL derived (by means that are not shown) from the pumped beam (frequency $\omega_o$) shifted in frequency ($\omega_o + \delta$). The detection is of the heterodyne type after beating of the beam FOL and of the return beam FT1.

It can therefore be seen that the device of the invention has the following advantages:

Control of the direction of the beam in a wide angle field (for example ±60°).

Correction of wave front for each angular direction selected by means of a 2D spatial modulator.

Selective amplification of the angular direction chosen by a non-linear medium.

Detection of the return signal on a single receiver regardless of the direction of the beam.

It is quite clear that the above description has been given purely as an example.

In particular, the numerical values have been given only to illustrate the description.

Other alternative embodiments could be considered without going beyond the scope of the invention.

What is claimed is:

1. A device to control the direction of a first light beam, emitted by a laser source comprising the following different, successive elements aligned in the direction of this first light beam:

A low-deflection, controlled deflection device, that receives the first light beam and transmits a second beam along a second direction which is chosen from among several directions and makes an angle with the direction of the first beam;

a holographic multiplexer comprising several recorded zones, each giving, for each beam received by each zone along said second direction, a third beam, the direction of which depends on said second direction;

shutters with open/close control, each placed in one possible direction of the third beam, enabling the choice of transmission of one or more defined third beams.

2. A device, according to claim 1, to control the direction of a beam, wherein the controlled deflection device is an acousto-optic deflection device.

3. A device, according to claim 1, to control the direction of a beam wherein the controlled deflection device is a grating of electro-optic phase-shifting devices.

4. A device, according to claim 1, to control the direction of a beam wherein the shutters are made with a liquid crystal display screen controlled by an array of column electrodes and an array of line electrodes, each intersection between a column electrode and a line electrode constituting a shutter.

5. A device, according to claim 1, to control the direction of a beam wherein the shutters are made with a layer of an electro-absorbent material, electrically controlled by line electrodes and column electrodes.

6. A device, according to claim 1, to control the direction of a beam wherein the deflection device is arranged along a line so as to enable an angular deflection in a plane.

7. A device, according to claim 1, to control the direction of a beam wherein the deflection device is arranged along a plane so as to enable an angular deflection in space.

8. A device, according to claim 1, to control the direction of a beam, further comprising a light beam amplifier placed at the outlet of the shutters.

9. A device, according to claim 8, to control the direction of a beam, wherein the amplifier is a light-refracting crystal amplifier device that receives the beam coming from the shutters and an amplification pump beam.

10. A device, according to claim 1, to control the direction of a beam, further comprising a phase corrector placed in the path of the beam coming from the laser source and set so as to counter-balance the phase distortions due to the various optic elements of the control device.

11. A device, according to claim 1, to control the direction of a beam, further comprising a beam output optic system placed at the outlet of the control device.

12. A detection device, applying the control device according to claim 1, wherein an electro-optic detection device is associated with the pumped beam by a semi-reflecting strip so as to receive a detection light beam coming from outside the device.

13. A detection device according to claim 12, wherein a light beam, of a frequency shifted with respect to that of the pumped wave, is mixed with the detection light beam so as to achieve heterodyne detection.

* * * * *